Figure 1:
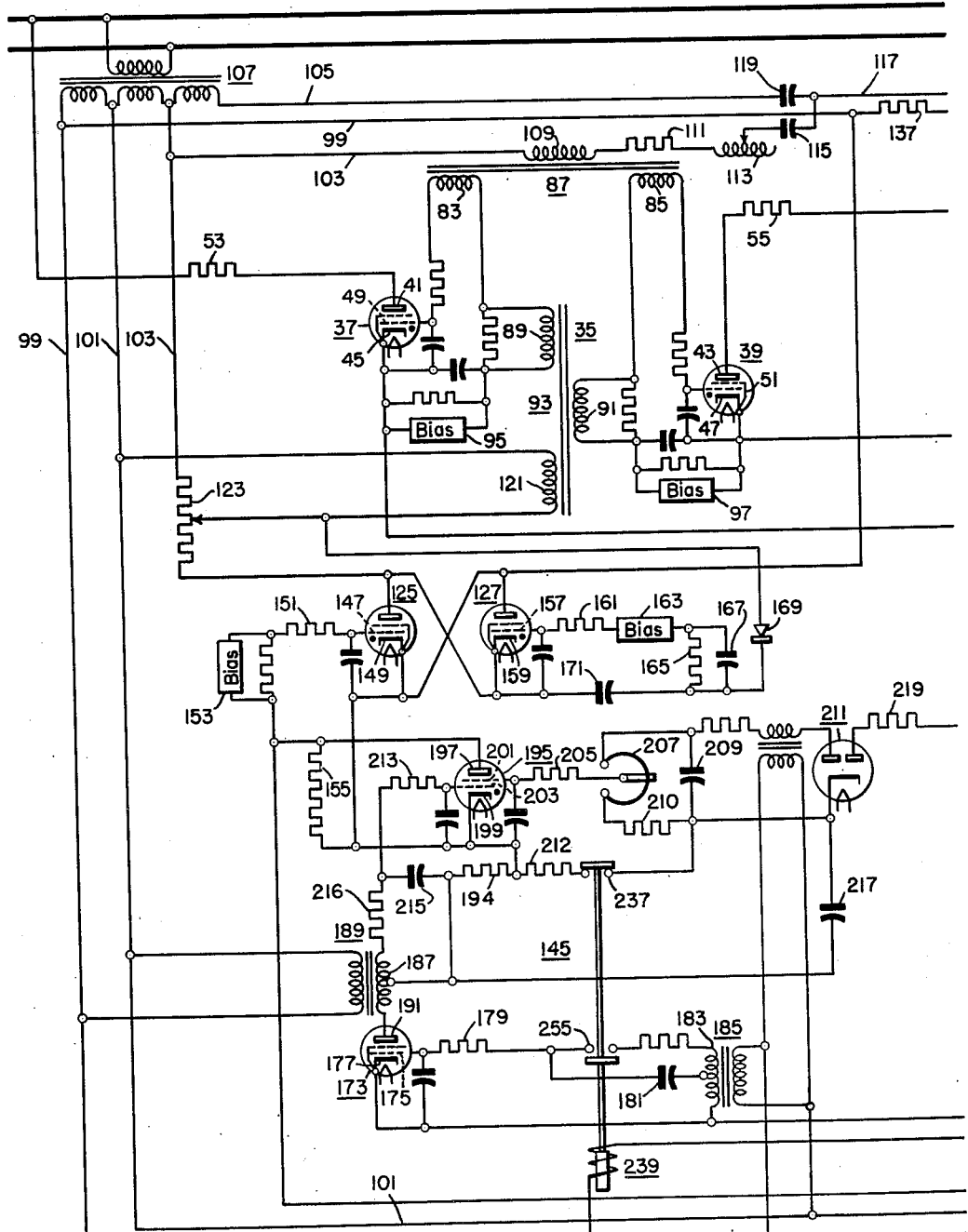

Patented May 16, 1950

2,508,145

UNITED STATES PATENT OFFICE 2,508,145

WELDER

Lewis H. Daniels and Henry L. Lindstrom, Detroit, Mich., assignors to Westinghouse Electric Corporation, East Pittsburgh, Pa., a corporation of Pennsylvania Application February 5, 1949, Serial No. 74,792

14 Claims. (Cl. 315—246)

Our invention relates to electric discharge apparatus and it has particular relation to resistance welders of the multiple electrode type.

It is the present practice in the automobile and aircraft industries and in others to weld large sections of the bodies and other component parts of vehicles in a single operation. For this purpose large welding presses are provided. Each press is designed to weld a particular part and includes a number of welding electrodes corresponding to the number of welds to be produced. Customarily, the welding is of the multiple point type. That is, the welding electrodes engage the welding material along the line which is to be welded and the welding current is conducted between a conjugate pair of welding electrodes from one electrode through one region to be welded, then along the material through another region to be welded to the other electrode. A unitary section of a vehicle which is to be welded may have different thicknesses in different areas. In performing a single press welding operation on such a unitary section, it is frequently desirable that the welding current conducted through the areas of different thickness be of different magnitudes. To avoid loading the power facilities excessively, it is also desirable that in performing a single press welding operation the welding current be conducted in succession through the various welding electrodes, or through selected groups of the welding electrodes. Facilities must be provided for conducting current of different magnitudes through the material to be welded during different successive intervals.

In accordance with the teachings of the prior art of which we are aware, a tap transformer is provided for presetting the current conducted at the various welding points. This transformer is interposed between the main supply and the welding transformer primaries and is connected to these primaries through adjustable tap switches. The cost of the tap transformer and the tap switches for a press welder of the type often encountered in practice is of the order of $1000. The tap transformer and its switches are moreover large and cumbersome. The setting of the tap switches introduces complexities in the use of the welding press requiring costly supervision.

It is accordingly an object of our invention to provide a low cost, multiple welding point welding press which shall be adapted to supply welding current of different magnitudes at the different points.

Another object of our invention is to eliminate the tap transformer and tap switch and its attendant disadvantages from a multiple point welding press designed to operate with different currents at the different welding points.

A further object of our invention is to provide for a multiple point welding press a control system which in operation shall transmit to the various welding points current of different magnitudes.

An ancillary object of our invention is to provide for the control of a current supply an electronic timer which shall operate to permit to flow, during a series of preselected time intervals, current of preselected magnitudes.

According to our invention, we provide a multiple point welding system which is in use energized from an alternating current supply and which includes discharge valves between the supply and each welder. The valves are fired from a unitary firing circuit and the duration of the firing is timed from a unitary timing circuit. The phase of the firing of the valves with reference to the oscillations of the supply is determined by the relative magnitudes of dephasing impedances. For this purpose a unitary fixed impedance and a plurality of variable impedances, each capable of producing a dephasing effect when combined with the fixed impedance, are provided. Each of the variable impedances is associated with a welder. When a valve is to be fired, its associated impedance is connected to the unitary impedance in the firing circuit. The desired timing is produced by the charging of an energy storage device. This device may be selectably charged through one of a plurality of impedances. Each of these impedances is associated with a welder. When a valve is to be fired, its associated impedance is connected to the energy storage component and the latter is charged through it. The dephasing impedances associated with the valves and the impedances through which the storage component is charged are adjustable and may be preset to yield the desired timing and phase control.

In accordance with our invention we also provide a sequencing system for firing the different valves and a preselected succession.

Figure 2:
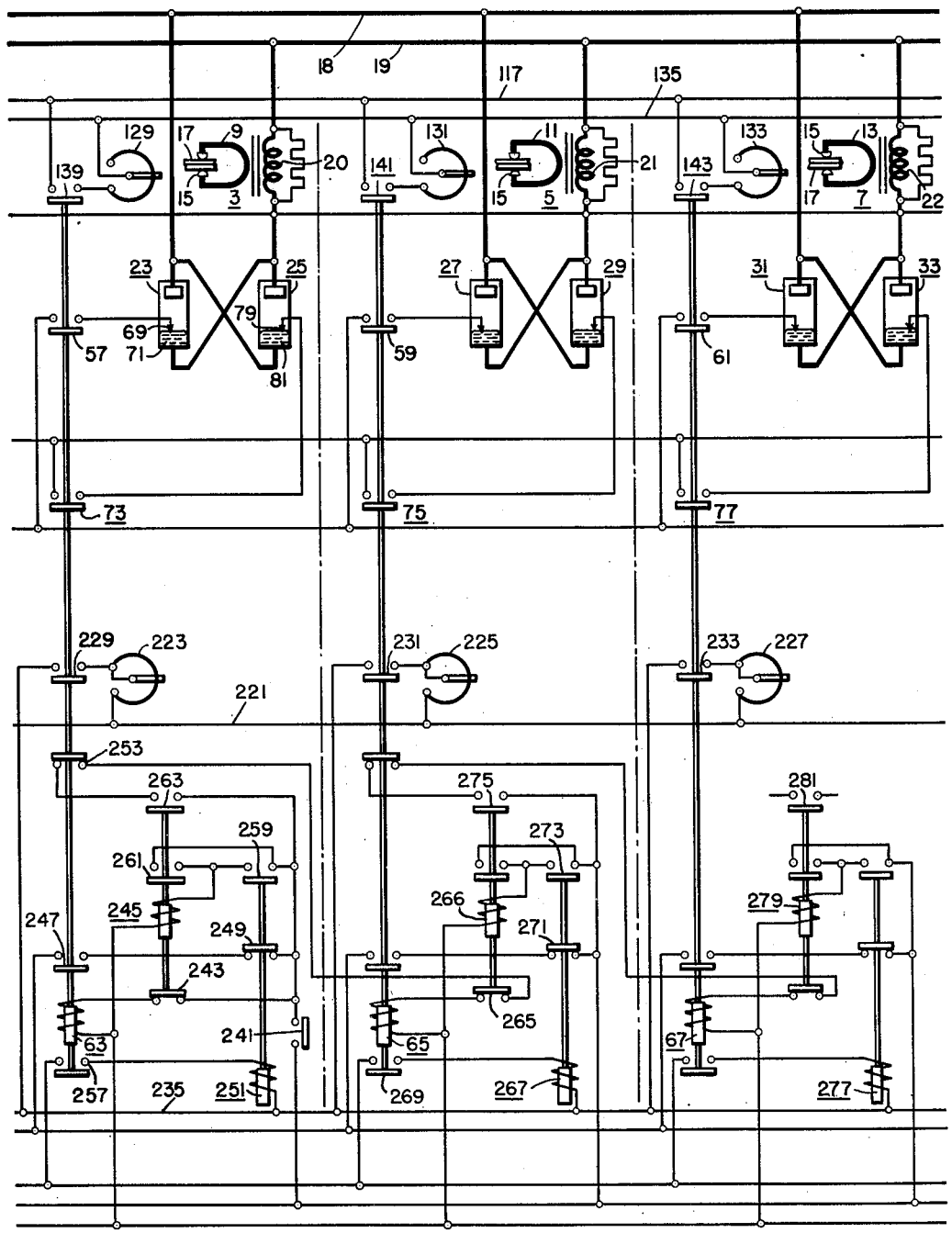

The novel features that we consider characteristic of our invention are set forth with particularity in the appended claims. The invention itself, however, both as to its organization and its method of operation, together with additional objects and advantages thereof will be understood from the following description of a specific embodiment when read in connection with the accompanying drawings in which Figures 1 and 2 together constitute a circuit diagram of apparatus in accordance with our invention.

The apparatus shown in the drawings includes a plurality of welders symbolically represented by welding transformers 3, 5, and 7. The secondary 9, 11 and 13 of each of the transformers 3, 5, and 7 respectively has connected to its terminals a pair of welding electrodes 15. These electrodes are in the practice of our invention disposed at two regions of a material 17 to be welded. When a transformer is energized, current is conducted through the material 17 and the welding electrodes 15 at the two regions.

Power is supplied to the welding transformers 3, 5, and 7 from a pair of buses 18 and 19 which may be of the usual commercial alternating current 60 cycle type. The primaries 20, 21 and 22 of each of the transformers 3, 5, and 7 is connected between the buses 18 and 19 through a pair of ignitrons 23 and 25, 27 and 29, and 31 and 33 respectively in anti-parallel. As shown in the drawings, all transformers are energized from a single phase supply. The transformers may also be energized from different pairs of phase conductors of a polyphase supply. Under such circumstances, additional switching mechanisms (relays) should be provided to connect the heat control and timer supplies (described hereinafter) to the phase to which a welding transformer in operation is connected so that proper synchronism may be maintained between the heat control and timing and the anode potential of the ignitrons in operation at any time.

For firing the ignitrons 23 to 33 a unitary firing circuit 35 is provided. This circuit includes a pair of thyratrons 37 and 39 each having an anode 41 and 43, a cathode 45 and 47, and a control electrode 49 and 51. The anode 41 is connected through a current limiting resistor 53 directly to one of the supply buses 8. The other anode 43 is connected through resistor 55, and normally open contacts of relays 63, 65, and 67, through the primaries 20, 21 and 22 and another resistor 55 to the other bus 19. The cathode 45 is in the quiescent state of the apparatus disconnected from the supply 18, 19 at normally open contacts 57, 59 and 61 of a plurality of sequencing relays 63, 65 and 67 respectively. Each of the relays 63, 65 and 67 is associated with a different pair of the ignitrons 23, 25, 27, 29, and 31, 33 respectively. When one of these relays (say 63) is actuated, the cathode 45 of the thyratron 37 is connected through the ignitor 69 and cathode 71 of its associated ignitron (23 in this case) and through the primary 20 of the associated welding transformer 3 to the bus 19. The cathode 47 of the other firing thyratron 39 is similarly connected to normally open contacts 73, 75 and 77 of the sequencing relays 63, 65 and 67 respectively. When relay (again 63) is actuated this cathode 47 is connected to the same bus 19 through the ignitor 79 and cathode 81 of the other of the associated ignitron 25 and the primary 20.

Between the control electrodes 49 and 51 and the cathodes 45 and 46 of each of the firing thyratrons 37 and 39 respectively, the secondaries 83 and 85 respectively of transformer 87, the secondaries 89 and 91 respectively of a transformer 93 which performs a timing function and a bias 95 and 97 respectively are connected. In accordance with the preferred practice of our invention, the actuating transformer is of the type capable of impressing a potential of short duration compared to the half periods of the supply in the control circuits of the firing thyratron. The peaking transformer 87 and the timing transformer 93 are supplied from a plurality of auxiliary buses 99, 101, 103 and 105 energized from an auxiliary transformer 107. The primary 109 of the peaking transformer 87 is connected at one terminal to an intermediate one 103 of these buses; at the other terminal, it is connected through a resistor 111, a variable reactor 113, and a capacitor 115 to a normally unenergized auxiliary bus 117. This bus 117 is connected to the end bus 105 through another capacitor 119. The primary 121 of the timing transformer 93 is connected between another intermediate bus 101 and the adjustable tap of a rheostat 123. One terminal of the rheostat 123 is connected to the intermediate bus 103 to which the primary 109 of the peaking transformer is connected. A pair of thyratrons 125 and 127 are connected in anti-parallel between the other terminal of the rheostat 123 and the remaining terminal auxiliary bus 99.

The phase of the potentials impressed on the primary 121 of the timing transformer relative to the supply potential 18, 19 is such that during the quiescent state of the apparatus, the timing transformer impresses a large negative potential between the control electrodes 49 and 51 and the cathodes 45 and 47 of each of the thyratrons 37 and 39 during the half periods when the corresponding anode potentials are positive to maintain the thyratrons non-conductive. When these thyratrons 125 and 127 are rendered conductive the blocking potential supplied by the timing transformer 93 is materially reduced and the firing thyratrons 37 and 39 may be rendered conductive.

The reactor 113 and the capacitor 115 constitute a timing network. This network serves to set the potential impressed by the secondaries 83 and 85 to the proper phase relationship with the source potential.

An adjustable rheostat 129, 131 and 133 is associated with each of the welding transformers 3, 5, and 7 respectively. The adjustable taps of these rheostats are connected to a further auxiliary bus 135, which is connected to the terminal bus 99 through a resistor 137. One of the terminals of each of these rheostats 129, 131, 133 is connected to an open contact 139, 141, 143 respectively of a sequence relay 63, 65, 67 respectively associated with the same transformer as the rheostat. When any one of the relays (say 63) is actuated this terminal of the corresponding rheostat 129 is connected to the bus 117. The capacitor 119 in series with the connected rheostat (129 in the example) is thus connected between the terminal buses 99 and 105. The primary 109 is then connected between the junction of the capacitor 119 and the adjustable rheostat 129 and the intermediate bus 103. Accordingly the potential impressed in the control circuits of the firing thyratrons 37 and 39 by the peaking transformer 87 has a phase displacement with reference to the main bus 18, 19 potential which is dependent on the setting of the rheostat connected in circuit with the capacitor. When the potential of the timing primary 121 is reduced by the conductivity of the anti-parallel connected thyratrons 125 and 127, this potential impressed by the peaking transformer, depending on its polarity, is sufficient to render one or the other of the firing thyratrons 37 and 39 conductive. The instants in the half periods of the supply when the firing thyratrons are rendered conductive is determined by the setting of whatever variable rheostat 129, 131 or 133 happens to be connected to the capacitor 119.

The anti-parallel connected thyratrons 125 and 127 are controlled from a timing circuit 145. The control electrode 147 of one of these thyratrons 125 is connected to its cathode 149 through a current limiting resistor 151, a bias 153, and a timing resistor 155. In the quiescent state of the apparatus, the bias 153 is sufficient to maintain this thyratron 125 non-conductive. The control electrode 157 of the other 127 of the pair of thyratrons is connected to its cathode 159 through a current limiting resistor 161, a bias 163, a network consisting of a resistor 165 and a capacitor 167 in parallel, a rectifier 169 of the preferably dry type, and a portion of the rheostat 123. Between the network 165—167 and the cathode 159 an additional capacitor 171 is connected. While the first 125 of the pair of thyratrons is non-conductive the bias 163 maintains the other thyratron 127 non-conductive. When the first thyratron 125 is conductive during a positive half period of the supply (for it) the capacitor 171 is charged by the current flow through the rectifier 169 and the second thyratron 127 is rendered conductive during the intervening half periods of the supply. The anti-parallel thyratrons 125 and 127 are thus connected in a follow circuit.

The timing circuit 145 includes a start thyratron 173. The control electrode 175 of this thyratron is connected to the cathode 177 through a current limiting resistor 179, a capacitor 181, and a portion of the secondary 183 of a control transformer 185. During the half periods of the supply, when the potential of the top of transformers 185 to which the capacitor 181 is connected is positive relative to the cathode terminal, the capacitor is charged by grid current to a potential such as to maintain the start thyratron 173 non-conductive. The start thyratron 173 is supplied through the tapped secondary 187 of a transformer 189, one terminal of which is connected to the anode 191. The timing resistor 155 is connected to the intermediate tap of this secondary 187 through another resistor 194. When the start thyratron is conductive current flows through the timing resistor 155 and a potential is impressed between the control electrode 147 and the cathode 149 of the leading thyratron 125 of the anti-parallel connected pair and this thyratron is rendered conductive. The following thyratron 127 follows and the firing tubes are actuated so long as the current flow through the timing resistor 155 continues.

The current flow through the timing resistor 155 is terminated when a stop thyratron 195 is rendered conductive. This thyratron includes an anode 197, a cathode 199, and a pair of control electrodes 201 and 203. The anode 197 and cathode 199 are connected to the respective terminals of the timing resistor 155. One of the control electrodes 201 is connected through a current limiting resistor 205, a rheostat 207, and resistors 210 and 212 to the cathode 199. A capacitor 209 is connected across the rheostat 207. This capacitor 209 is charged through one section of a double diode 211 to a potential such that the currrent drawn by the rheostat impresses a negative potential between the control electrode 201 and the cathode of the stop thyratron. The other control electrode 203 is connected to the cathode 199 of the stop thyratron 195 through a current limiting resistor 213, a capacitor 215 and the resistor 194. This capacitor 215 is connected through a resistor 216 between the mid tap and the remaining terminal of the secondary 187 of the transformer 189 which supplies the start tube 173 and positive and negative half waves of control potential are impressed between the control electrode 203 and the cathode 199. This control potential is displaced in phase with reference to the source potential by an angle predetermined by the relationship between resistor 216 and capacitor 215. Normally these phase shifted potential pulses impressed on the stop tube 195 when the upper terminal of the secondary 187 is positive relative to the mid tap are insufficient to counteract the bias on the control electrode 201 and the thyratron 195 is maintained non-conductive. The bias on the control electrodes 201 and 203 may be counteracted by charge accumulated on a capacitor 217 which times the duration of a weld. This capacitor is at one terminal connected to the intermediate tap of the secondary 187 from which the start thyratron 173 is supplied. At the other terminal the capacitor is connected through the remaining section of the double diode 211 and a resistor 219 to another auxiliary line 221.

Adjustable rheostats 223, 225 and 227, which cooperate with the timing capacitor 217 to determine the timing, are associated with each of the welding transformers 3, 5, and 7 respectively. At one of its terminals each timing rheostat is connected to the line conductor 221. At their adjustable taps, these rheostats are each connected to a normally open contact 229, 231, and 233 of an associated sequence relay 63, 65 and 67 respectively. When the contact (say 229) of any one of the relay 63 is closed, the associated rheostat 223 is connected to another auxiliary line conductor 235 which leads to the cathode 177 of the start thyratron 173. If the start thyratron is then conductive, the timing capacitor 217 is charged through the timing rheostat 223, and the section of the double diode 211. In the quiescent state of the apparatus, the timing capacitor 217 is connected in a discharge circuit through normally closed contacts 237 of a relay 239 which controls the timing. When these contacts 237 are opened and the start thyratron 173 is conductive, the capacitor 217 is charged at a rate dependent on the timing rheostat (223 in the above example) in series therewith. When the potential of the capacitor 217 reaches a predetermined magnitude, the potential pulses impressed on the control electrode 203 of the stop thyratron 195 from the secondary 187 during the half periods when the intermediate tap of this secondary is negative relative to the upper terminal become sufficient to render the stop thyratron conductive. The stop thyratron then shunts out the timing resistor 155 and the conductivity of the cross connected thyratrons 125 and 127 and of the firing thyratrons 37 and 39 is interrupted. Because the potential half wave which renders stop thyratron 173 conductive is displaced in phase relative to the supply potential, and therefore relative to the potential impressed on the leading thyratron 125, the anti-parallel thyratrons 125 and 127 complete a cycle of operation after thyratron 195 becomes conductive.

The operation of our system is initiated by closure of a switch 241. If our invention is applied to a press, this switch may be actuated by the press operator or it may be actuated when the press is in proper position to produce a weld.

Closure of the start switch 241 causes current to flow from bus 101 through the switch, normally closed contacts 243 of an auxiliary relay 245, the exciting coil of the first sequence relay 63 to bus 99. The first sequence relay 63 is actuated. At its now closed contact 139, this relay connects the firing phase setting rheostat 129 to the capacitor 119. At another contact 229 this relay connects the associated timing rheostat 223 to the cathode 177 of the start thyratron 173. At the two contacts 57 and 73, it connects the ignitors 69 and 79 of the associated ignitrons 23 and 25 to the cathodes 45 and 47 of the corresponding firing thyratrons 37 and 39. At still another contact 247, this sequence relay 63 connects the exciting coil of the timing relay 239 between the bus 99 and the bus 101 through the normally closed contact 249 of a relay 251 which controls the transfer of operation from one welder to another and the start switch. At a now open contact 253 of this sequence relay 63, the circuit through the exciting coil of the next sequence relay 65 to operate is maintained open so that the latter will not accidentally be actuated while the first sequence relay 63 is actuated.

The timing relay 239 is now actuated. At its now open contact 237, this relay opens the discharging circuit for the timing capacitor 217; at a now closed contact 255, this relay connects the upper terminal of the secondary 183 of the control transformer 185 to the control electrode 175 of the start tube 173 and the latter is rendered conductive. Current now flows from a terminal of the secondary 187 through the anode 191 and cathode 177 of the start tube, the now closed contact 229 of the first sequence relay 63, the timing rheostat 223 in series therewith, the resistor 219 and diode 211, the timing capacitor 217 to the intermediate tap of the secondary 187. The capacitor now begins to charge at a rate dependent on the setting of the timing rheostat 223. Current also flows in a circuit extending from a terminal of the secondary 187 through the anode 191 and cathode 177 of the start tube, the exciting coil of the transfer relay 251, a now closed contact 257 of the first sequence relay 63, the timing resistor 155, the resistor 194 to the intermediate tap of the secondary. Because the timing resistor is now interposed in this circuit, the current flow through it is insufficient to actuate the transfer relay 251. The drop in potential produced across the timing resistor 155 is, however, sufficient to render the leading one 125 of the anti-parallel connected thyratrons 125 and 127 conductive.

These thyratrons now conduct and the corresponding firing thyratrons 37 and 39 are rendered conductive at instants predetermined by the setting of the phase determining rheostat 113 in series with the capacitor 119. The corresponding ignitrons 23 and 25 to which the firing thyratrons are connected are now rendered conductive and current of the magnitude predetermined by the setting of the phase determining rheostat 113 flows through the associated welding transformer 3 to weld the material 17 in the region in which the electrodes connected to this transformer are disposed. This current continues to flow until the timing capacitor 217 is charged to a potential such as to counteract the bias 239 on the stop thyratron 195. The latter is rendered conductive. The timing resistor 155 is now shunted out and the anti-parallel connected thyratrons 125 and 127, the firing thyratrons 37 and 39, and the ignitrons 23 and 25 are rendered non-conductive after they complete their last cycle of operation. The current flow through the exciting coil of the transfer relay 251 is also increased substantially and the latter relay is actuated.

At its now open contact 249 this transfer relay 251 opens the circuit through the exciting coil of the timing relay 239. The latter drops out closing the discharge circuit for the timing capacitor 217 to permit the latter to discharge. At the now open contacts 255 of the timing relay, the firing circuit for the start thyratron 173 is opened. The transfer relay has at its now closed contacts 259 also closed a circuit through the exciting coil of the auxiliary relay 245. The auxiliary relay is actuated and locks itself in at one of its now closed contacts 261. At the now open contact 243 of the auxiliary relay 245 the circuit through the exciting coil of the first sequence relay 63 is opened and the latter drops out. At a now open contact 247 of the relay 63 the circuit through the exciting coil of the relay 239 is maintained open. When the firing circuit for the start thyratron 173 is opened at contact 255 the latter is rendered non-conductive rendering the stop thyratron 197 non-conductive. The circuit through the exciting coil of transfer relay 251 also opens at now open contact 257 (and also because the start and stop thyratrons 173 and 195 are non-conductive) but auxiliary relay 245 remains locked in.

At a now closed contact 263 of the auxiliary relay 245, a circuit is closed through the start switch 241, the normally closed contact 253 of the sequence relay 63, a normally closed contact 265 of another auxiliary relay 266 associated with the second transformer 5 and, the exciting coil of the second sequence relay 65. The second sequence relay now is actuated closing circuits associated with a second welding transformer 5 which are similar to the circuits associated with the first transformer. The start relay 239 is again actuated and the above described operations are repeated. This time, the welding current flowing through the second welding transformer 5 and the interval during which the current flows and the heat control at which it flows is determined by the settings of the rheostats 131 and 225 associated with the second welding transformer 5. When at the end of the second welding time interval the stop thyratron 195 is rendered conductive, sufficient current to actuate a second transfer relay 267 flows in a circuit extending from a terminal of the secondary 187 through the anode 191 and the cathode 177 of the start tube 173, the exciting coil of the second transfer relay 267, the now closed contacts 269 of the second sequence relay 65, the stop thyratron 195, the resistor 194 to the intermediate tap of the transformer 187. The second transfer relay is actuated. At its now open contact 271 it opens the circuit through the coil of the start relay 239. At its now closed contact 273 it closes a circuit through the exciting coil of the second auxiliary relay 266. The latter is actuated and locked in. The second sequence relay 65 now drops out because the circuit through its exciting coil is opened at the now open contact 265 and a circuit is closed thorugh the now closed contact 275 of the auxiliary relay 266 and through the exciting coil of the third sequence relay 67.

The above described operations are then again repeated for the third of the group of welding transformers. Again current flows for a time interval and at a heat control setting determined by the rheostats 227 and 133 respectively associated with the third transformer 7. The current flow continues until a third transfer relay 277 is actuated when the stop thyratron 195 becomes conductive for the third time. When the third stop relay is actuated a third auxiliary relay 279 is actuated and locked in. If the system includes only three welders or three sets of welders, the third auxiliary relay 279 at its now closed contact 281 may energize an indicator not shown which indicates to the press operator that the weld is complete and that he may release the press. This may also automatically close a circuit (not shown) for releasing the press.

Our invention has been shown herein as applied to a three unit system in which each welding unit includes only a single welder. Our invention may be applied to a system including any number of welding units each of which may be composed of more than one welder.

While we have shown and described a certain specific embodiment of our invention, we are fully aware that many modifications thereof are possible. Our invention, therefore, is not to be limited except insofar as is necessitated by the prior art and by the spirit of the appended claims.

We claim as our invention:

1. For use with a welding system including a plurality of resistance welding units; a unitary timer for timing the current flow through said units: a unitary heat control; connections for causing said timer to permit current to flow through each of said units in succession; and additional connections associated with each said timer for presetting the heat control at which said timer permits current to flow.

2. Apparatus for use in a welding press comprising a plurality of welding transformers; a valve for conducting current through each said transformer; a unitary timer for controlling the conductivity of said valves; a unitary heat control; connections between said timer and said valves for causing said valves to conduct in succession for a predetermined timed interval; and additional connections to said timer for presetting the heat control at which each said valves conducts.

3. In combination a plurality of resistance welders; a valve for conducting current through each said welder, each valve being non-conductive in the quiescent state of its corresponding welder; a unitary timer circuit for rendering said valves conductive during predetermined time intervals, the duration of said time interval being determinable by the magnitude of an electrical component when such component is connected in said circuit; a separate one of said components associated with each said welder, each separate component being adapted to be set to yield a time interval to correspond to the desired timing of its associated welder; and selective connections for connecting any one of said separate components to said timing circuit so that it determines the interval during which its associated valve is rendered conductive.

4. In combination a plurality of resistance welders; a valve for conducting current through each said welder, each valve being non-conductive in the quiescent state of its corresponding welder; a unitary timing circuit for rendering said valves conductive during predetermined time intervals, the duration of said time interval being determinable by the magnitude of an electrical component when such component is connected in said circuit; a separate one of said components associated with each said welder, each separate component being adapted to be set to yield a time interval to correspond to the desired timing of its associated welder; and selective connections between said circuit and said valves and between said circuit and said components for connecting said circuit to a selected valve so that it may be rendered conductive and for connecting to said circuit the one of said separate components which corresponds to said selected valve so that it determines the interval during which said selected valve is conductive.

5. In combination a plurality of resistance welders; a valve for conducting current through each said welder, each valve being non-conductive in the quiescent state of its corresponding welder; a unitary timing circuit for rendering said valves conductive during predetermined time intervals, the welding heat developed in one of said welders during said time interval being determinable by the magnitude of an electrical component when such component is connected in said circuit; a separate one of said components associated with each said welder, each separate component being adapted to be set to yield a time interval to correspond to the desired timing of its associated welder; and selective connections between said circuit and said valves and between said circuit and said components for connecting said circuit to a selected valve so that it may be rendered conductive and for connecting to said circuit the one of said separate components which corresponds to said selected valve so that it determines the heat developed in the welder associated with said selected valve while said valve is conductive.

6. In combination a plurality of resistance welders; a valve for conducting current through each said welder, each valve being non-conductive in the quiescent state of its corresponding welder; a unitary timing circuit for rendering said valves conductive during predetermined time intervals, the duration of said time interval being determinable by the magnitude of an electrical component when such component is connected in said circuit, and the welding heat developed in one of said welders during said time interval being determinable by the magnitude of another electrical component when such other component is connected in said circuit; a separate one of said components associated with each said welder, each separate component being adapted to be set to yield a time interval to correspond to the desired timing of its associated welder; a separate one of said other components associated with said welder, each said last-named component being adapted to be set to yield a heating effect to correspond to the desired developed heat of its associated welder, and selective connections between said circuit and said valves and between said circuit and said components for connecting said circuit to a selected valve so that it may be rendered conductive and for connecting to said circuit the one of said separate first-named components which corresponds to said selected valve so that it determines the interval during which said selected valve is conductive, and for connecting said other component associated with said selected welder so that it determines the heat developed in said welder during said interval.

7. For use with an alternating current supply and a plurality of loads each of which requires current only during a predetermined interval, the combination comprising; a separate valve for conducting current through each of said loads;

a unitary timing circuit, to be connected to said valves, for rendering said valves conductive, said circuit when it is connected rendering a valve conductive during a predetermined number of half periods of said supply when a first component of a predetermined magnitude is connected in said circuit, the conductivity of said last-named valve being initiated at instants during said half periods which are predeterminable by the magnitude of a second component when said second component is connected in said circuit; a separate one of said first components associated with each of said valves; a separate one of said second components associated with each of said valves; and switches for simultaneously connecting said timing circuit to one of said valves and the first and second components associated with said valve to said timing circuit.

8. For use with an alternating current supply and a plurality of loads each of which requires current only during a predetermined interval, the combination comprising; a separate valve for conducting current through each of said loads; a unitary timing circuit, to be connected to said valves, for rendering said valves conductive, said circuit when it is connected rendering a valve conductive during a predetermined number of half periods of said supply, the conductivity of said last-named valve being initiated at instants during said half periods which are predeterminable by the magnitude of a component when said component is connected in said circuit; a separate one of said components associated with each of said valves; and switches for simultaneously connecting said timing circuit to one of said valves and said component associated with said valve to said timing circuit.

9. A welding system including a plurality of welders, a unitary timer for timing the operation of said welders and switch mechanisms for selectively connecting said timer to time the operation of any one of said welders at the will of the operator, said timer being of the type which operates with a heat control determinable by an electrical component; characterized by a separate one of said components associated with each welder, said switch mechanism, when it connects said timer to a welder, operating to connect the associated component to said timer.

10. In combination a plurality of main supply terminals; a plurality of main load terminals; a separate pair of ignitrons connected in anti-parallel between one of said supply terminals and one of said load terminals; a unitary firing circuit for all said pairs of ignitrons; a plurality of auxiliary terminals for deriving an alternating potential; a capacitor connected to one of said auxiliary terminals; a plurality of variable resistors each associated with a pair of ignitrons, selective switch mechanism for simultaneously connecting said firing circuit to any one of said pair of ignitrons and the resistor associated with said one pair of ignitrons between another of said auxiliary terminals and said capacitor; and connections to the junction of said capacitor and said last-named resistor for deriving a potential to actuate said firing circuit to fire said one pair of ignitrons.

11. In combination a plurality of pairs of terminals; each pair consisting of a supply terminal and a load terminal; a separate pair of ignitrons connected in anti-parallel between each supply terminal and its associated load terminal; a unitary circuit for firing any of said pairs of ignitrons; a capacitor connected in said circuit which when charged to a predetermined potential interrupts the firing of a pair of ignitrons being fired; auxiliary terminals for charging said capacitor; an adjustable resistor associated with each pair of terminals; and selective switch mechanism for simultaneously connecting said unitary circuit to one of said pairs of ignitrons to fire said pair of ignitrons and the adjustable resistor associated with said pair of ignitrons being fired in circuit with said auxiliary terminals and said capacitor to charge said capacitor through said last-named resistor.

12. In combination a plurality of main supply terminals; a plurality of main load terminals; a separate pair of electric discharge valves connected in anti-parallel between one of said supply terminals and one of said load terminals; a unitary firing circuit for all said pairs of electric discharge valves, a plurality of auxiliary terminals for deriving an alternating potential; an impedance connected to one of said auxiliary terminals; a plurality of adjustable impedances each associated with a pair of said valves, each of said adjustable impedances having a dephasing effect with respect to said first-named impedance, selective switch mechanism for simultaneously connecting said firing circuit to any one of said pair of electric discharge valves and the adjustable impedance associated with said one pair of electric discharge valves between another of said auxiliary terminals and said first-named impedance; and connections to the junction of said first-named impedance and said adjustable impedance for deriving a potential to actuate said firing circuit to fire said one pair of electric discharge valves.

13. In combination a plurality of pairs of terminals; each pair consisting of a supply terminal and a load terminal; a separate pair of electric discharge valves connected in anti-parallel between each supply terminal and its associated load terminal; a unitary circuit for firing any of said pairs of electric discharge valves; an energy storing component connected in said circuit which when charged to a predetermined energy level interrupts the firing of a pair of electric discharge valves being fired; auxiliary terminals for charging said capacitor; an adjustable impedance associated with a pair of terminals; and selective switch mechanism for simultaneously connecting said unitary circuit to one of said pairs of electric discharge valves to fire said pair of electric discharge valves and the adjustable impedance associated with said pair of electric discharge valves being fired in circuit with said auxiliary terminals and said energy storage component to charge said energy storage component through said last-named impedance.

14. In combination a plurality of pairs of main terminals; each pair consisting of a main supply terminal and of a load terminal; a separate pair of electric discharge valves connected in anti-parallel between each supply terminal and its associated load terminal; a unitary circuit for firing said valves; a plurality of auxiliary terminals for deriving a potential to actuate said firing circuit; an impedance connected to one of said terminals; a plurality of adjustable impedances each associated with a pair of said main terminals connected to another of said auxiliary terminals, each adjustable impedance having a dephasing effect depending on its setting with respect to said main impedance; a unitary circuit for initiating actuation of, and for timing the firing operation of said firing circuit once said firing circuit is actuated, said timing circuit including an energy storage component; a firing operation being terminated when said component is charged to a predetermined energy level; another plurality of adjustable impedances each associated with a pair of said main terminals; another auxiliary terminal for charging said component connected to each of said last-named impedances; and selective switch mechanism for simultaneously connecting said firing circuit to one of said pairs of valves, said first named impedance to the one of said first-named plurality of impedances which is associated with said last-named pair of valves and said component to the one of said last-named plurality of impedances associated with said last-named pair of valves.

LEWIS H. DANIELS.
HENRY L. LINDSTROM.

No references cited.